United States Patent [19]

Parks et al.

[11] Patent Number: 5,243,851
[45] Date of Patent: Sep. 14, 1993

[54] PORTABLE IN-FIELD ENGINE TESTER

[75] Inventors: Jeffery S. Parks, Warren, Mich.; Joseph D. Brown, Belcamp, Md.

[73] Assignee: The United States Government as represented by the Secretary of the Army, Washington, D.C.

[21] Appl. No.: 876,308

[22] Filed: Apr. 30, 1992

[51] Int. Cl.⁵ .................... G01M 15/00; G01L 3/16; G01L 5/13

[52] U.S. Cl. .................. 73/116; 73/118.1; 73/865.9

[58] Field of Search ............ 73/116, 118.1, 162, 73/865.9

[56] References Cited

U.S. PATENT DOCUMENTS

| | | | |
|---|---|---|---|
| 2,741,830 | 4/1956 | Lewis | 73/118.1 |
| 3,136,156 | 6/1964 | Boone | 73/116 |
| 3,330,153 | 7/1967 | Perna | 73/116 |
| 3,505,863 | 4/1970 | Lucia | 73/116 |
| 3,675,914 | 7/1972 | Douglass | 73/116 |
| 3,712,127 | 1/1973 | Petersen | 73/118.1 |
| 4,466,294 | 8/1984 | Bennington et al. | 73/116 |
| 4,732,036 | 3/1988 | Weeder | 73/118.1 |
| 4,805,446 | 2/1989 | Brown | 73/118.1 |
| 4,848,717 | 7/1989 | Bevill | 73/116 |
| 5,097,699 | 3/1992 | Sano et al. | 73/118.1 |

FOREIGN PATENT DOCUMENTS 0455270 4/1975 U.S.S.R. .................. 73/162

Primary Examiner—Hezron E. Williams
Assistant Examiner—George M. Dombroske
Attorney, Agent, or Firm—Peter A. Taucher; David L. Kuhn

[57] ABSTRACT

The invention is a free standing engine tester that can be fabricated of steel stock and vehicle parts available in forward military areas where it is used. The tester has a vehicle transmission and "final drive" power take off units mounted to a frame, and the final drive units contain braking mechanisms by which a load can be applied to the engine. The engine and transmission are mounted on a frame whose configuration and low center of gravity prevent engine torque from tipping the tester. A winch mounted to the frame has a hand operated crank by which a person using the tester can sufficiently tension a brake actuation cable engaged to the braking mechanisms so that a stall load can be applied to the engine.

10 Claims, 4 Drawing Sheets

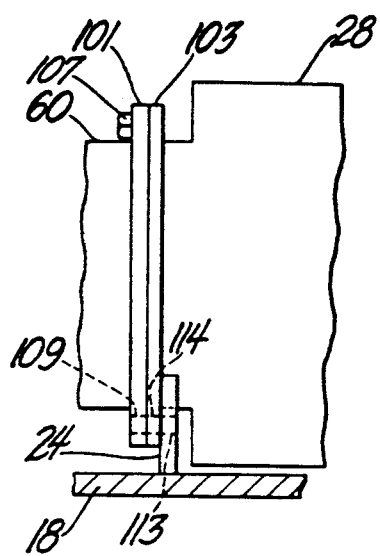
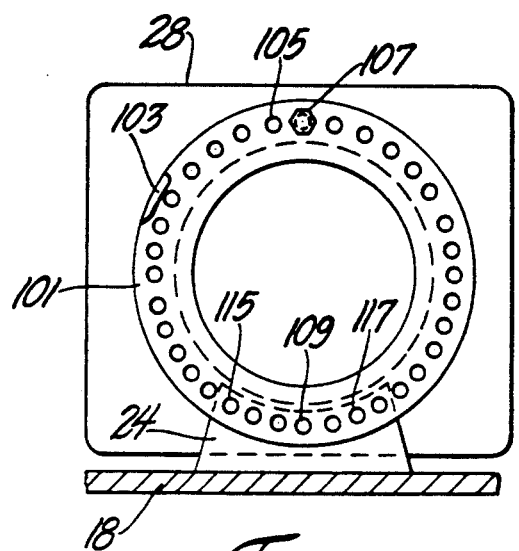
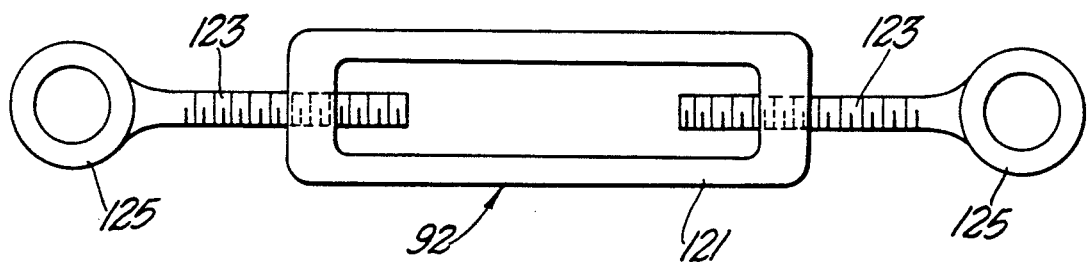

PORTABLE IN-FIELD ENGINE TESTER

GOVERNMENT USE

The invention described herein may be manufactured, used and licensed by or for the U.S. Government for governmental purposes without payment to us of any royalty.

BACKGROUND

One of the logistical problems inherent in military operations is the maintenance of ground vehicles such as tanks, armored personnel carriers, trucks and the like. As much as possible in such operations, maintenance is performed near battle zones to minimize down time of critically needed vehicles. Often such vehicles will receive major engine work or even engine overhauls wherein the engines are removed from the vehicle. Testing engines after repair is hindered by lack of heavy test equipment such as dynamometers, which can not be brought to forward military operational areas.

SUMMARY OF THE INVENTION

Our engine tester which can be used to test engines in a fully loaded condition and can be fabricated from materials typically found in a forward operational area. The tester is free standing, has skids for dragging it from one location to another and has a frame that is made of steel stock available in forward areas. Mounted to the frame are a transmission and so called "final drive" units that in some vehicles transfer power from the transmission to drive sprockets of the vehicle. The transmission and final drive units for our tester can be taken from vehicles too badly damaged to repair. A winch on the tester tensions a cable to actuate a braking mechanism in the final drive units, so that these units load the tested engine while it is running. The winch has a hand operated crank which allows one using the tester to apply sufficient load to the engine to stall it.

BRIEF DESCRIPTION OF THE DRAWINGS

FIG. 5 is a detail view showing the connection between the engine, the transmission and a bracket on the frame.

FIG. 6 is a detail view of the juxtaposition of the bracket and a flange on the transmission.

FIG. 7 shows a turnbuckle used to tension cables on our tester.

DETAILED DESCRIPTION

Figure 1:
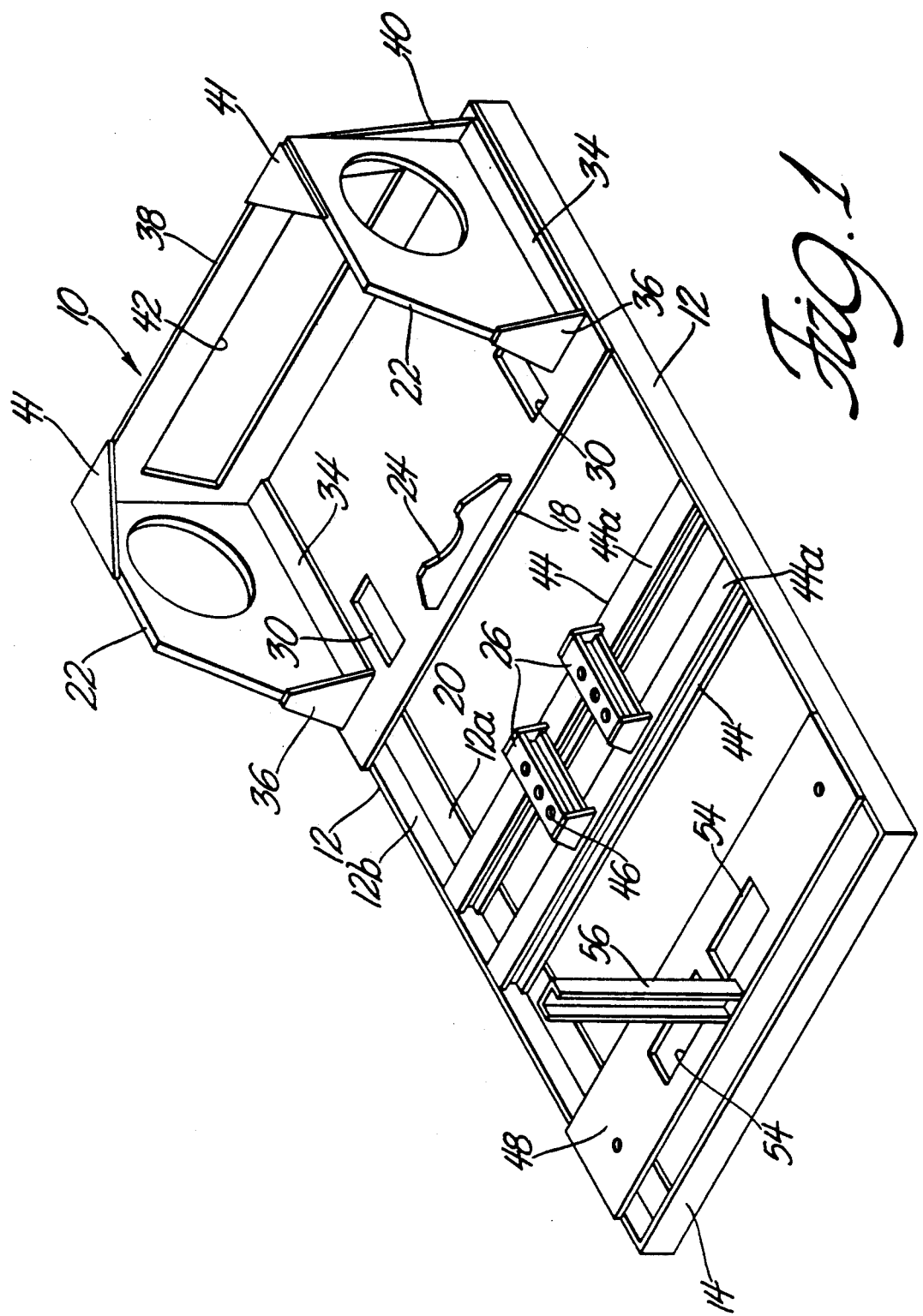
FIG. 1 is a right front perspective view of the frame of the engine tester, hidden lines being omitted for clarity.
Figure 3:
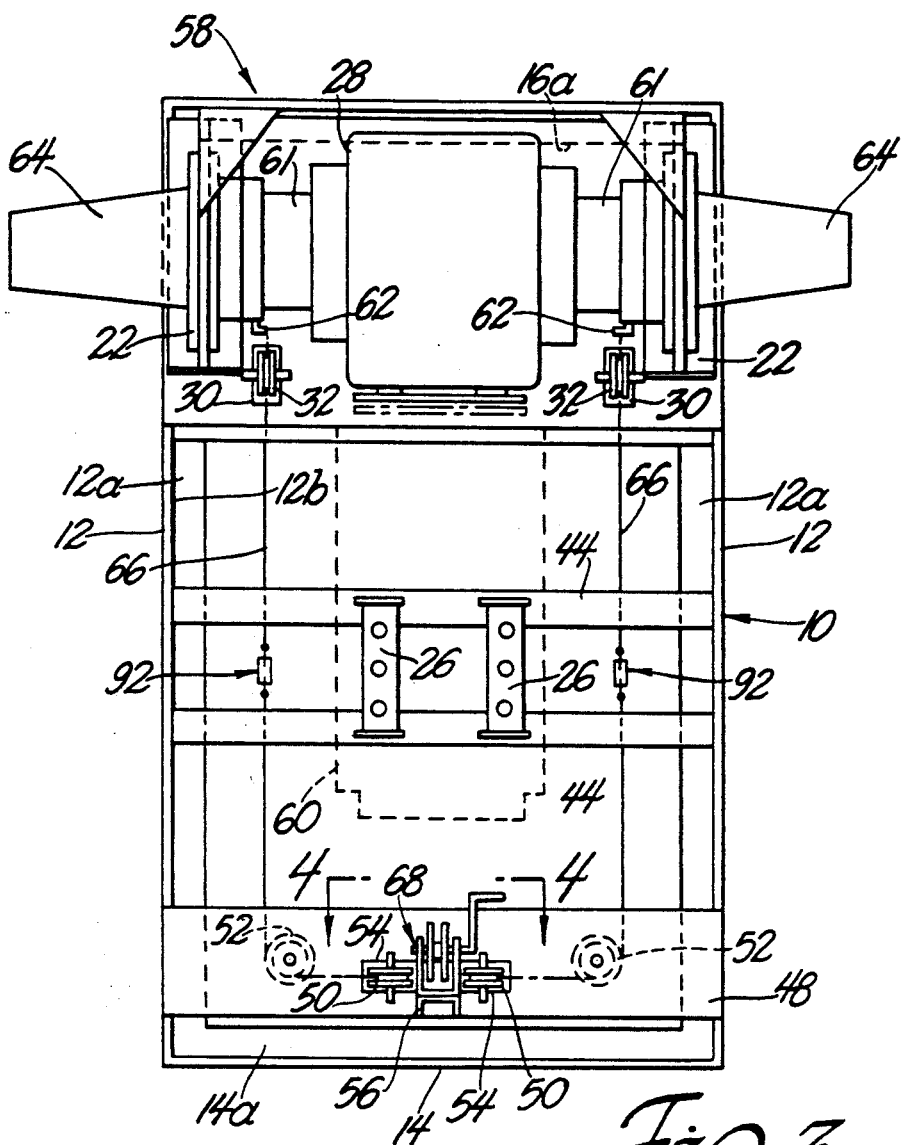
FIG. 3 is a plan view of the engine tester.
Figure 2:
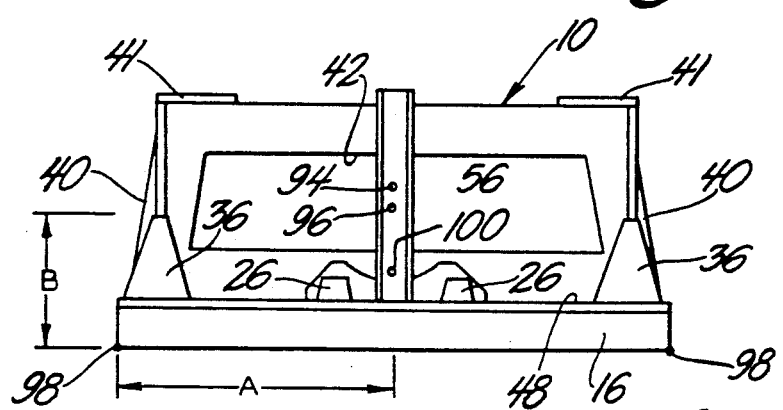
FIG. 2 is an end elevational view of the frame, hidden lines again omitted for clarity.

Shown in FIGS. 1 and 2 is the frame 10 for the engine tester, frame 10 having an open, rectangular base formed by longitudinal skids 12 fixed at their ends to transverse members 14 (FIG. 1) and 16 (FIG. 2). The skids and transverse members have integral flanges that face against the ground, the flanges being shown respectively at 12a, 14a and 16a (FIG. 3). Flanges 12a are skid surfaces that allow the frame to be dragged in sled-like fashion over sandy, pebbled or other kinds of surfaces, and keep the frame from sinking into soft ground. The openness of the frame removes mass from its center and concentrates mass at its periphery, thereby stabilizing the frame against tipping.

Fixed to and spanning skids 12 at one end of the rectangular base is floor plate 18, one edge of the floor plate fixed to transverse member 16 (FIG. 3) so that the rectangular base and floor plate reinforce each other. Upper face 20 of floor plate 18 is a flat reference surface for locating parallel side walls 22, support bracket 24, and possibly even engine mounts 26. Additionally, plate 18 acts as a reference surface and support for transmission 28 (FIG. 3) and also serves to catch fluid leaks from the transmission. Floor plate 18 defines two rectangular orifices 30 that accommodate guide wheels 32 (FIG. 3) that are part of a brake actuation mechanism to be described later.

FIGS. 5 and 6 are detail views showing how support bracket 24 affixes the assembly of engine 60 (FIG. 3) and transmission 28 to floor plate 18. As better seen in FIG. 5, engine 60 has an annular flange 101 which faces against complementary transmission flange 103. Flanges 101 and 103 have congruent patterns of bolt holes comprised of holes such as at 105. For simplicity and clarity, all these bolt holes are omitted from FIG. 5, except for engine flange hole 109, transmission flange hole 111, and bracket hole 113. The respective bolt holes of transmission flange 103, engine flange 101 and bracket 24 are in registry so that conventional bolts, as at 107 can fasten these elements together. Particularly, as seen in FIG. 5, engine flange hole 109, transmission flange hole 111 and bracket hole 113 are in alignment. By this construction, the connection between engine 60 and transmission 28 is stiffened by frame 10, thereby inhibiting relative twisting motion between the engine and the transmission about their mutual axis when the engine runs. Thus only five or six bolts, placed about the flanges, are needed for this connection, whereby the mounting of engine 60 to the engine tester is made faster and easier.

Elongate footers 34 are perpendicularly fixed to the bases of side walls 22 so as to form a "T" intersection therewith, the lower faces of the footers bearing flatly and conformingly against plate 18. Footers 34 are permanently fixed to plate 18 by any suitable means such as welding, bolting or clamping, and this fixed attachment helps stiffen the plate. Trapezoidal gussets 36 are welded at their bases to both floor plate 18 and ends of footers 34, and one surface of each gusset 36 is welded to an edge of a respective wall 22, thereby enhancing mutual support among walls 22, footers 34, plate 18 and gussets 18 themselves.

Connective wall 38 is welded at its base to transverse member 16. Wall 38 is also welded at its interior surface to side walls 22 such that triangular flanges 40 of connective wall 38 lie outward of side walls 22. Flanges 40 act as exterior braces for these walls, thereby minimizing the tendency of wall 22 either to bend about the intersection between itself and footer 34 or to break away from the footers. Corner braces 41 are welded to walls 22 and 38 further stiffen the connection therebetween. Wall 38 defines a window 42 that reduces the weight of frame 10 and provides access to transmission 28 (FIG. 3), the window preferably taking up the majority of the surface area of wall 38 so as to enhance the degree to which the center of gravity of frame 10 is lowered.

Connected between skids 12 intermediate the ends thereof are two parallel cross members 44 that rest on and are fixed to flanges 12a, these members also butting against and fixed to the upright wall portions 12b of skids 12. Cross members 44 reinforce frame 10 and are preferably I-beams whose top flange surfaces 44a are flush with the top of upright walls 12b. Surfaces 44 will provide a shelf or step where personnel can walk or place items such as tools when they are installing an engine to be tested. Such a shelf is useful when drip pans (not shown) are, as is preferred, placed between one cross member 44 and plate 18 and between the other cross member 44 and transverse member 14. A pair of engine mounts 26 bridge the cross members and are welded thereto, the mounts having apertures as at 46 for accommodating engine mounting bolts.

At the opposite end of frame 10 from connective wall 38 is a an elongate transverse plate 48 welded between skids 12. Plate 48 reinforces one end of the frame, provides a shelf upon which personnel can step or place fasteners and tools and serves as a mount for guide wheels as at 50 and 52 (FIG. 3). Additionally, plate 48 defines two apertures 54 to accommodate wheels 50 and has a vertical post 56 fixed thereto.

Shown in FIG. 3 is the entire engine tester assembly 58 including transmission 28 mounted at plate between side walls 22. Engine 60, shown in phantom, is bolted to transmission 28 and is bolted to mounts 26. Connected to and extending transversely from the transmission are conventional final drive units 61, these units passing through walls 22. Each final drive unit 61 is a combination of a braking mechanism and a gear train connection between transmission 28 and the drive sprockets of a vehicle. A lever 62 extending through the housing of each final drive unit actuates the braking mechanism when moved. Specially made covers 64 shield the otherwise exposed ends of the final drive units' gear trains from the external environment and protects personnel from moving gear train parts.

A means for hand actuation of the braking mechanisms includes cables 66 attached at one end to levers 62 and thence passing around guide wheels 32. The cables then pass through cross members 44, around guide wheels 52, around guide wheels 50 and into connection with winch 68, whereby turning crank 70 actuates the braking mechanisms. Winch 68 is preferably mounted at the top of post 56 at about waist height for person standing nearby, thereby allowing that person to easily operate the crank. Winch 68 is forward of engine 60, so that parts of a blown engine, which fly upward or laterally with respect to the engine, will not hit the person operating winch 68.

Figure 4:
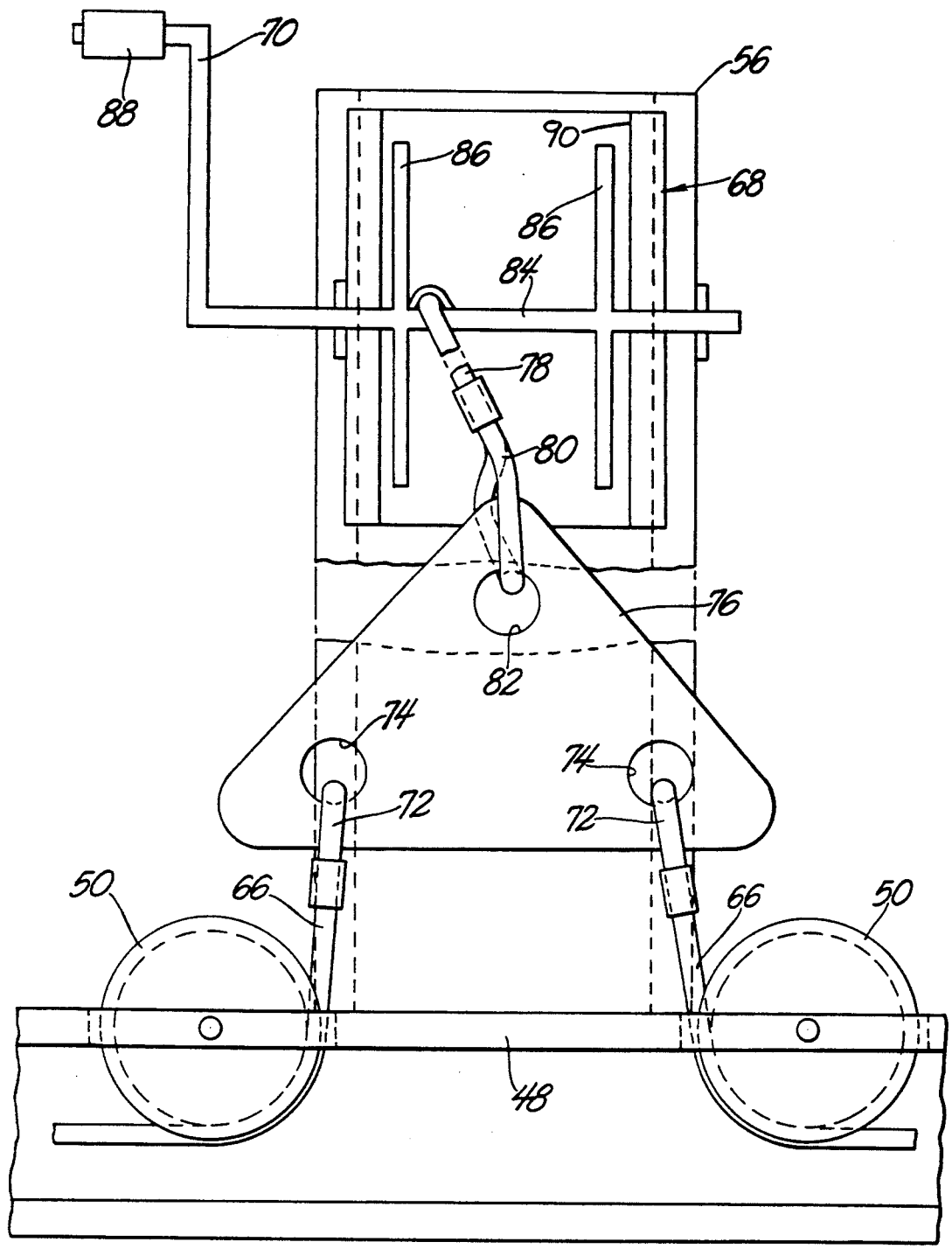
FIG. 4 is a view taken along line 4—4 in FIG. 3, FIG. 4 showing details of a winch of the tester.

FIG. 4 shows more details of winch 68 and its connection with cables 66, wherein cables 66 have closed loops 72 passing through apertures 74 in link 76, such that the loops can move relative to the plate. Winch cable 78 is similarly loosely connected to link 76 by means of closed loop 80 passing through aperture 82, which is equidistant from apertures 74. One end of winch cable 78 is fastened to round axis rod 84 whose radius is at least two and typically several times smaller than the radius of turning of crank handle 88. Disk-like retainers 86 prevent cable 78 from rubbing the inner peripheral surface of bracket 90 in which rod 84 is rotatingly mounted, bracket 90 itself being fixed to post 56.

The tension, and to some extent, the length, of cables 66 can be adjusted by turnbuckles 92, which are comprised of eye bolts 123 threadingly engaged with turnbuckle body 121. Segments of cables 66 are fastened to respective eyes 125, whereby turning body 121 increases or decreases cable tension.

To test a rebuilt engine such as engine 60, the engine is first run at a standardized maximum speed or r.p.m. and then a sufficient load is applied to the engine to make it stall. The load is applied by turning crank 70, which results in the actuation of levers 62 and thereby the actuation of the braking mechanisms of final drives 61. If the engine performs to predetermined standards upon application of the stall load, the rebuilt engine will be considered ready for use.

During engine testing, torque from the engine or transmission will tend to pivot assembly 58 about frame edge 98, which is shown in FIG. 3. To avoid tipping of the tester, it is preferred that dimension "A", be at least two to three times the dimension "B", where dimension "A" is one-half the width of frame 10 and dimension "B" the height of center of gravity 96 from the ground as seen in the plane of FIG. 2. Center of gravity 96 is the vector sum of the combined transmission and engine's center of gravity 94 and the frame's center of gravity 100. The frame's center of gravity is preferably at the height of the tops of engine mounts 26, as shown in FIG. 2, or lower. It is desired that center of gravity 100 be as much lower than center of gravity 94 as is possible, whereby dimension "B" is minimized and the anti-tipping inertia of the frame has enhanced effect.

We wish it to be understood that we do not desire to be limited to the exact details of construction shown and described herein since obvious modifications will occur to those skilled in the relevant arts without departing from the spirit and scope of the following claims.

We claim:

1. An engine tester, comprising:
   a frame;
   a transmission mounted to the frame;
   a final drive unit connected to and driven by the transmission, the final drive unit having a braking mechanism;
   a side wall on the frame through which protrudes the final drive unit;
   means for actuating the braking mechanism comprising a winch mounted to the tester and a brake cable connected between the braking mechanism and the winch.

2. The tester of claim 1 further including a hand operated crank on the winch.

3. The tester of claim 2 further comprising;
   two brake cables;
   a link defining two brake cable engagement holes and a winch cable engagement hole equidistant from the brake cable engagement holes;
   first fastening mechanisms at ends of the brake cables attaching the brake cables to the link, the first fastening mechanisms passing loosely through the cable engagement holes, whereby the brake cables have controlled mobility relative to the link;
   an axis rod on the winch having a rod radius at least two times smaller than a radius of rotation of the crank;
   a winch cable connected to the axis rod;
   a second fastening mechanism at an end of the winch cable attaching the winch cable to the link, the second fastening mechanism passing loosely through the winch cable engagement hole, whereby the winch cable has controlled mobility relative to the link.

4. The tester of claim 1, further comprising:
a first plate on one end of the frame supporting the transmission and reinforcing the side wall;
a second plate at another end of the frame reinforcing the frame, the second plate having a support surface engagable by a human foot so as to support a person on the frame;
a footer at a base of the side wall, the side wall having a flat lower surface bearing against the second plate; and
a connective wall fixed to the second plate, the side wall and the footer, the connective wall defining a flange laterally outward of the side wall, the flange fixed to an end of the footer.

5. The tester of claim 4 further including a cable guide wheel rotatably mounted to the first plate, whereby the first plate performs the function of rotatably mounting the cable wheel to the frame.

6. The tester of claim 5 further including a second guide wheel rotatably mounted to the second plate, whereby the second plate performs the function of rotatably mounting the second guide wheel to the frame.

7. A free standing engine tester usable at remote sites, comprising:
a frame defining an open rectangular base including elongate skids;
ground engagement flanges on the skids;
a transmission mounted to the frame;
means for braking an engine, the braking means operatively connected to the transmission;
connection means for matingly fastening the engine to the transmission;
means for mounting the engine to the frame, the mounting means including a mounting member fixed both to the connection means and to the frame, whereby the frame inhibits relative movement between the engine and the transmission.

8. An engine tester, comprising:
a frame;
a transmission mounted to the frame;
means operatively connected to the transmission for braking the engine;
means for actuating the braking means, the actuating means including a winch mounted on the tester and a linkage connected between the braking means and the winch.

9. The engine tester of claim 8 further including a crank on the winch.

10. The tester of claim 9 wherein:
the linkage is a brake cable; and
the crank is a manually operated crank.

* * * * *